INVENTOR
Pierre Stroobants
By Robert E. Burns
ATTORNEY

May 31, 1955 | P. STROOBANTS | 2,709,597
MAGNETIC SOUND RECORDING APPARATUS
Filed June 20, 1951
3 Sheets-Sheet 2
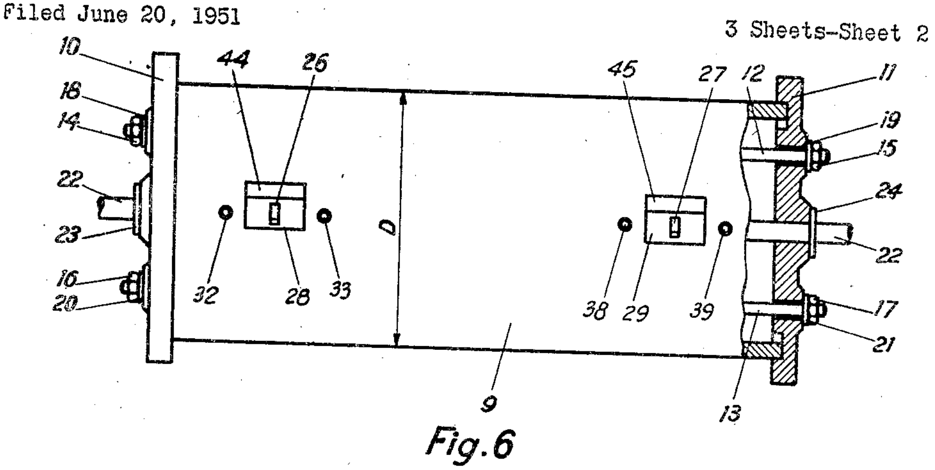
Fig. 6
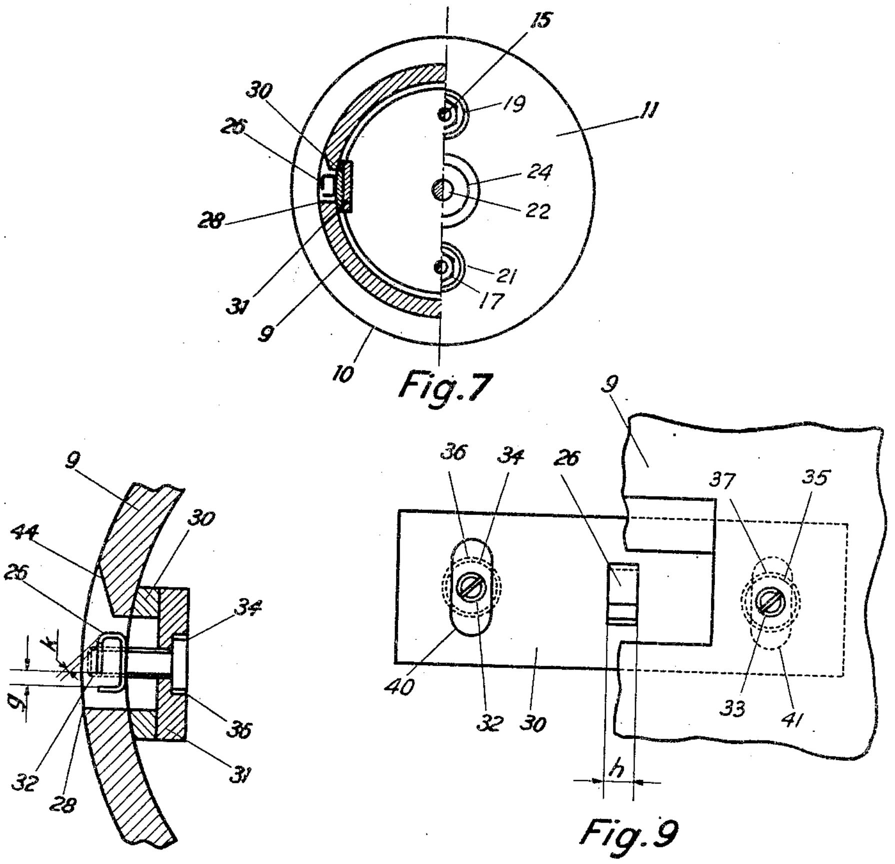
Fig. 7, Fig. 9
Fig. 8
INVENTOR
Pierre Stroobants
By Robert E. Burns
ATTORNEY May 31, 1955 P. STROOBANTS 2,709,597

MAGNETIC SOUND RECORDING APPARATUS

Filed June 20, 1951 3 Sheets-Sheet 3

INVENTOR
Pierre Stroobants
By Robert E. Burns
ATTORNEY

United States Patent Office 2,709,597

Patented May 31, 1955

2,709,597

MAGNETIC SOUND RECORDING APPARATUS

Pierre Stroobants, Anderlecht-Brussels, Belgium, assignor to Ateliers de Constructions Electriques de Charleroi, Brussels, Belgium, a company of Belgium Application June 20, 1951, Serial No. 232,503

Claims priority, application France July 4, 1950

6 Claims. (Cl. 274—40)

The present invention relates to apparatus for recording and reproducing sound magnetically, with the magnetogram or magnetic record carrier in the form of a rectangular sheet, adapted to be wound upon a cylinder for the purpose of recording and reproduction, the cylinder being rotated about its axis while the recording or reproducing member moves parallel to the cylinder axis so as to explore the record sheet along a track extending helically around the cylinder.

The magnetic record sheet may be made of magnetizable material or formed of a non-magnetizable material coated with a thin film of a magnetizable material. Such magnetic record sheets commonly consist of a flexible carrier, made of paper or other pliable material like photographic film or a film of plastic material, which can be folded or even crumpled, coated on one face with finely divided particles of magnetic material, applied upon the carrier by any suitable means.

The present invention comprises an improved construction of such record sheets with the object of registering the position of the sheet upon its support during exploration so as to obtain accurate alignment of the magnetic lines or tracks, whatever be the recording and reproducing apparatus, so as to re-establish at each exploration the desired register between the magnetic recording or reproducing members and the magnetic lines or tracks.

The invention likewise comprises an improved construction of the support for the magnetic record sheet during its exploration, with the object of securing regular exploration over a perfectly cylindrical surface during the exploration of the whole sheet, the magnetic recording and reproducing members bearing constantly upon the sheet during its whole exploration.

The present invention further comprises improved means for attaching the record sheets upon their support, with the object of obtaining great mobility, the placing or removal of a sheet being effected easily and quickly.

Magnetic recording and reproducing apparatus is already known in which the record sheets are attached, either by insertion of the edge of the sheet in a longitudinal slot upon the exploration cylinder, or by perforations in the sheet co-operating with hooks or spurs provided upon the exploration cylinder, or by perforations in the sheet co-operating with hooks or spurs provided upon the exploration cylinder. Such constructions either necessitate adjustment of the position of the record sheet or they prevent the full utilization of the available area of the sheet and cylinder.

According to the present invention the record sheet is temporarily attached mechanically at one edge to the exploration cylinder, the attachments extending in the direction of the width of the sheet and along a line parallel to the cylinder axis. The length of the record sheet is greater than the circumference of the cylinder, so that, after the sheet has been attached to and wound upon the cylinder, its free edge overlaps the attached edge, thereby providing a continuous magnetic surface for exploration by the recording or reproducing member.

The record sheet is provided on one edge, in the direction of the width, for its attachment to the cylinder, with two eyelets made of non-magnetic material, integral with the sheet or secured thereto. These eyelets are fixed at the edge of the sheet and project therefrom.

The exploration cylinder is provided with two attachment hooks, adapted to co-operate with the eyelets of the record sheet, these hooks being located in cavities thereon, within the cylindrical volume defined by the record sheet wound upon it so that, after the sheet has been attached to and wound upon the cylinder, the exploration surface shall be perfectly cylindrical, corresponding to the full width of the sheet, without any projecting parts liable to make contact with the magnetic recording or reproducing members.

The attachment hooks on the exploration cylinder and the eyelets on the record sheet are shaped in such a way that the engagement or disengagement of the eyelets can be effected only in a definite relative position of the cylinder and record sheet, any accidental detachment of the sheet in the course of operation being prevented.

One attachment hook on the exploration cylinder and the corresponding eyelet on the record sheet are so shaped as to ensure by the simple operation of attaching the sheet to the cylinder, proper register between the recording or reproducing members and a magnetic track or line on the record sheet. The hook selected for this purpose may be provided with adjusting means to allow a slight displacement in a direction tangential to the exploration cylinder or perpendicular to the longitudinal axis of the cylinder.

The exploration cylinder is provided with a covering made of elastic or flexible material, textile or plastic, intended to provide for the magnetic recording or reproducing members a sliding surface that is easily deformable by slight pressure. This covering includes a movable flap intended to bridge over the cylinder cavities containing the attachment hooks, during the winding of the record sheet upon the cylinder, the action of this flap in the winding and unwinding of the record being ensured by stationary pressure fingers which press the record sheet upon the cylinder.

Although the invention is applicable to various forms of construction of magnetic sound recorders, it is particularly suitable for dictating machines, by reason of the rapid placing and removal of the record sheets.

The essential features of the invention, as well as other secondary features, will be understood from the description which follows with reference to the accompanying drawings. In these drawings which represent, by way of non-limiting example, one form of construction of magnetic record sheets and their application to a magnetic dictating machine:

Fig. 6 is an elevation partly in section of an exploration cylinder for co-operation with the record sheet represented in Fig. 1.

Fig. 7 is an end view, partly in section, of the exploration cylinder.

Figs. 8 and 9 are detail views of attachment hooks provided upon the exploration cylinder.

Figure 1:
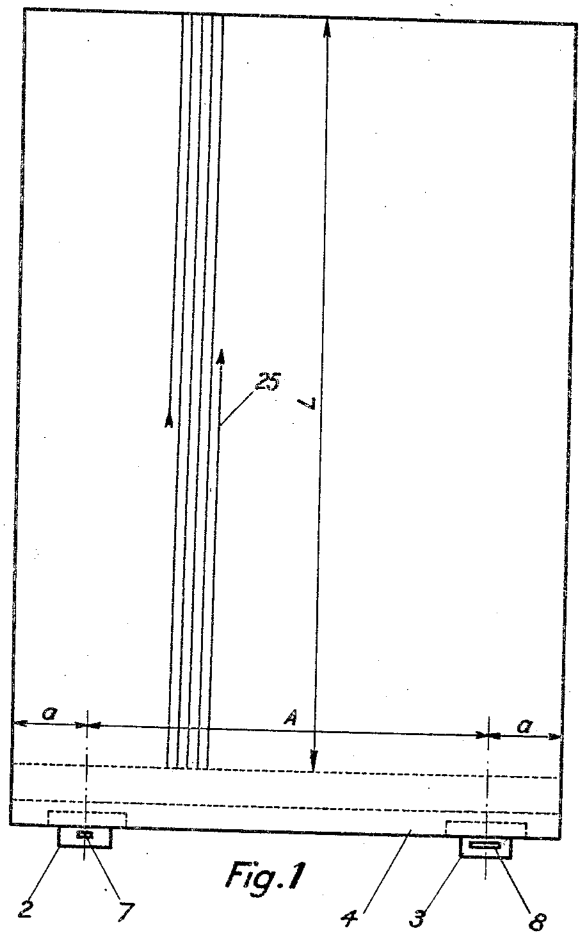
Fig. 1 is a plan view of a magnetic record sheet according to the invention.

The magnetic record sheet 1, Fig. 1, can be made, as already stated, of magnetizable material or formed of a non-magnetizable material covered with a film of magnetizable material, consisting for example of a flexible carrier made of paper or plastic material coated on one face with finely divided particles of magnetic material.

The record sheet 1 is of rectangular shape, being of any size or format, suitable for the operations in which it will be utilized. However, with the object of standardization, and to facilitate filing with other documents which are used in commerce and industry, it is advisable to choose a size or format currently utilized. This will allow the user, when his correspondents are provided with magnetic dictating machines identical with or similar to that at his own disposal, to dispense with supplementary typewriting work, the record sheet being conveniently folded and transmitted by post to the correspondent.

Consequently, there will preferably be adopted one of the ordinary "commercial" sizes or formats, or in certain cases, the size or format utilized for "official" documents.

Whatever be the size or format adopted for the magnetic record sheets, the latter are provided, according to the invention, upon one of their edges, lying in the direction of the width of the sheet, with two eyelets, made of brass or other metal or alloy not susceptible of magnetic remanence, or with two eyelets made of non-metallic material, suitably resistant to wear, for example plastic material of suitable characteristics, the eyelets being represented at 2 and 3 in Fig. 1.

These eyelets 2 and 3 are fixed at a distance *a* from the respective edges lying in the direction of the length of the record sheet, by any suitable means, the distance *a* being variable according to the size or format of the sheet.

For example, in order to be able to utilize concurrently upon the same dictating machine record sheets of two commercial sizes or formats, very similar in general dimensions but differing by 5 mm. in width, the distance *a* will be chosen for example equal to 22.5 mm. for the larger size or format and to 20 mm. for the smaller, so that the distance A between the eyelets remains constant.

Figure 2:
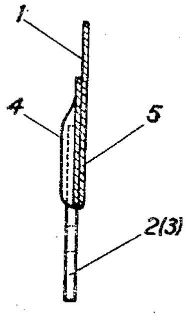
Fig. 2 and Fig. 3 are detail views, in section and on a larger scale, showing an example of attaching eyelets upon the sheet.
Figure 3:
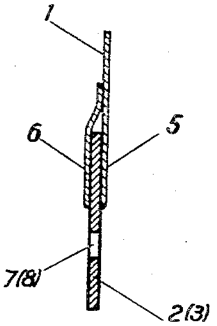

Several methods of fixing the eyelets 2 and 3 upon the record sheet 1 are possible. In the form illustrated, the fixing is effected by adhesive. For this purpose, each eyelet is provided with a stub or talon which is engaged in a fold 4 of the record sheet, the portions 5 and 6 of the sheet 1 being then stuck together (Figs. 2 and 3), so that the magnetic surface shall be on the exterior of the fold 4. The portions of the eyelets 2 and 3 projecting out through the fold 4 of the record sheet 1 are formed with perforations 7 and 8, adapted to co-operate with attachment hooks upon the exploration cylinder, as hereinafter described.

Whether for recording or for reproduction, the record sheet 1 is placed upon an exploration cylinder 9, Fig. 6. The cylinder is made of non-magnetic material, for example aluminum, placed between two end-plates 10 and 11. These end-plates are connected by two rods 12 and 13, clamping force between the end-plates being obtained by nuts 14 and 15, 16 and 17, screwed upon the rods 12 and 13. Pressure washers 18, 19, 20 and 21 are interposed between the end-plates 10 and 11 and the locking nuts.

The assembled exploration cylinder is supported by a shaft 22 extending through both end-plates 10 and 11, this shaft being made fast with the end-plates by pressure exerted upon the washers 23 and 24, the shaft 22 being driven in any suitable manner so as to ensure a continuous rotation of the cylinder.

The respective dimensions of the record sheet 1 and of the exploration cylinder 9, are such that:

(*a*) the length of the cylinder 9 is slightly greater than the width of the record sheet 1 intended to be utilized upon the dictating machine;

(*b*) the length of the record sheet 1 is slightly greater than the circumference of the cylinder 9 so that there is an overlap when the sheet is wound upon the cylinder.

In this way, the operation of placing a record sheet upon the exploration cylinder is greatly facilitated, because there is no need for care in registering the extreme edges of the sheet, as would be the case if the length of the sheet were equal to the circumference of the cylinder.

By reason of the overlap, the magnetic record sheet is explored helically only over a length L equal to the exterior circumference ($\pi$.D) of the cylinder, neglecting the thickness of the record sheet, and along parallel magnetic lines or tracks 25. These magnetic tracks, explored in the direction indicated by the arrows, Fig. 1, are equidistantly spaced by the amount of displacement of the magnetic recording or reproducing members, along a line parallel to the longitudinal axis of the cylinder, while the latter effects one complete revolution.

The width of the portion of the record sheet 1 which is not utilized for recording or reproduction, is solely conditioned by the requirements of the attachment of the sheet 1 to the cylinder 9. By a judicious dimensioning of the parts, it is possible to reduce this width to a minimum, so as to avoid too great a waste of magnetic material in the operation of the dictating machine.

Figure 4:
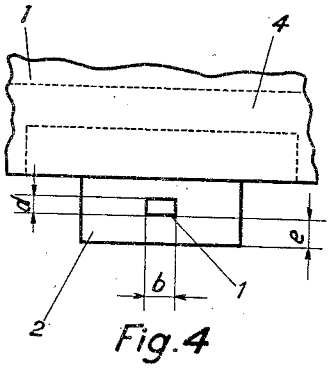
Figs. 4 and 5 are detail plan views of these eyelets, illustrating their particular characteristics.
Figure 5:
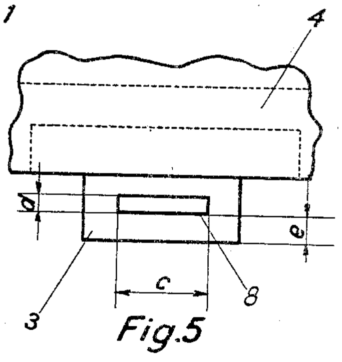

As explained above, the eyelets 2 and 3 provided upon the record sheet 1 are intended to co-operate with attachment hooks fast with the exploration cylinder 9, in order to fix the record sheet temporarily upon the cylinder. Figs. 4 and 5 show details of construction and fixing of the eyelets; Figs. 8 and 9 show corresponding details of the hooks.

In the exploration cylinder 9, there are provided two rectangular cavities or openings 28 and 29 intended to house the hooks 26 and 27 and to receive the eyelets 2 and 3 during the attachment of the record sheet 1 to the cylinder. There will now be described the mode of fixing and adjusting one of the hooks, for example the hook 26.

The hook 26 is secured for example by soldering or by a screw to an adjusting plate 30, Figs. 7 to 9. This plate, intended to come into contact with the internal surface of the cylinder 9, is shaped in such a way that its surface coming into contact with the cylinder is part cylindrical, of the same curvature as the interior of the cylinder 9. A second plate 31, acting as a locking plate, is applied against the adjusting plate 30 and the assembly is made fast with the cylinder 9 by means of two screws 32 and 33, for example with left-hand threads, of which the heads 34 and 35 bear upon the locking plate 31, in recesses 36 and 37 provided for this purpose.

Similarly, the hook 27 is made fast with the exploration cylinder 9 by means of screws 38 and 39.

As already stated, with a view to simplifying the operation of attaching the record sheet to the exploration cylinder, while yet ensuring proper register between the recording or reproducing members and a magnetic line or track, it is particularly desirable to obtain, by the simple operation of engaging the sheet eyelets upon the cylinder hooks, the same alignment of the magnetic lines or tracks for every exploration.

Such a result can be obtained by shaping in a judicious manner the eyelets of the record sheet and the attachment hooks of the exploration cylinder, so that the record sheet and the hooks always occupy the same relative position, adjustments being also provided for restoring the register between the magnetic lines or tracks and the recording or reproducing members.

For this purpose, the eyelets of the record sheet and the hooks provided on the exploration cylinder are shaped in such a manner that, after the sheet has been attached to the cylinder according to a definite method, there cannot be any slipping of the sheet in relation to the cylinder, either parallel to the longitudinal axis, or transversely to the latter.

The eyelets 2 and 3 (see Figs. 4 and 5) are of rectangular shape. They are each provided with a perforation 7 or 8, likewise rectangular, of which the longitudinal edges are parallel to the direction of the width of the record sheet 1.

The hooks 26 and 27 are formed of suitably bent strip metal, each presenting an opening in which is engaged the eyelet co-operating with the respective hook, the latter engaging edgewise in the perforation 7 (or 8) of the eyelet.

Careful manufacture of the record sheet 1 with its eyelets 2 and 3 and of the exploration cylinder 9 with its hooks 26 and 27, makes it possible to obtain satisfactory parallelism between the edge of the sheet lying in the direction of its width and the longitudinal axis of the cylinder, when the sheet is attached to the cylinder.

In order to avoid accidental disengagement of the record sheet from the hooks 26 and 27 during the operation of the dictating machine, it is advantageous to construct the eyelets and hooks in such a manner that the attachment or the removal of a record sheet can only be done when the latter is in a plane approximately radial to the cylinder, at the position of the hooks.

The respective dimensions of the eyelets 2 and 3 and of the hooks 26 and 27 are such that:

(*a*) The width *d* of the perforations 7 and 8 of the eyelets 2 and 3 is slightly greater than the thickness *k* of the hooks 26 and 27;

(*b*) The width *e* of the part of the eyelets 2 and 3 engaging in the hooks 26 and 27, is greater than the width *g* of the opening in the hooks 26 and 27, so that an accidental slipping of the eyelet out of a hook is rendered impossible.

In order to be able to ensure proper register between the recording or reproducing members and the magnetic lines or tracks of the record sheets to be utilized, adjusting means must be provided.

For this purpose:

(*a*) The eyelet perforation 7 and the hook 26 co-operating with it, have respective widths *b* and *h* such that the width *b* is a trifle larger than the width *h* so that the eyelet 2 can be fixed upon the hook 26 without appreciable transverse play;

(*b*) With a view to compensating for possible faults in manufacture as well as the variations of dimensions of the recording sheet due to variations of the hygrometric state of the atmosphere, the perforation 8 of the eyelet 3 has a width *c* considerably greater than the width of the hook 27, this latter being for example equal to the width *h* of the hook 26;

(*c*) The screws 32 and 33 securing the hook 26 to the exploration cylinder 9, traverse the adjusting plate 30 through two elongated holes 40 and 41, in such a manner that, before definite fixing of the hook 26, the adjusting plate 30 can be slightly displaced so as to obtain perfect register between the recording or reproducing members and the magnetic lines or tracks, and in particular to obtain perfect register between the start and end of magnetic lines or tracks, when the sheet, recorded upon one apparatus, is reproduced upon another.

This adjustment can be effected once for all, during the manufacture of the dictating machine utilizing the devices according to the invention. The adjustment can be performed by the help of special jigs, of great accuracy, which will dispense from any further adjustment during the temporary attachment of the record sheets upon dictating machines, either for recording or for reproduction. If desired, these machines can be provided with a device allowing the register to be re-established by sliding the support of the recording and reproducing members in relation to the exploration cylinder; the devices according to the invention have for primary object to allow of disposing the record sheets upon the exploration cylinder in such a manner that the magnetic lines or tracks preserve a constant inclination in relation to the longitudinal axis of the exploration cylinder.

Figure 10:
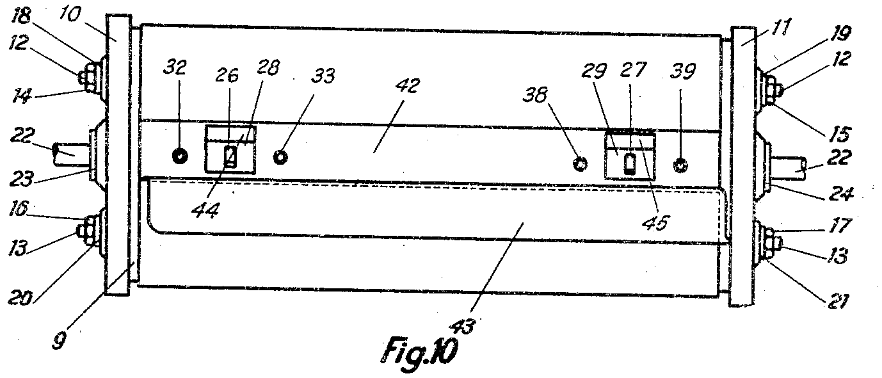
Figs. 10 and 11 are respectively an elevation and a cross-section of this same cylinder, illustrating a movable flap for covering the attachment hooks on the exploration cylinder.
Figure 11:
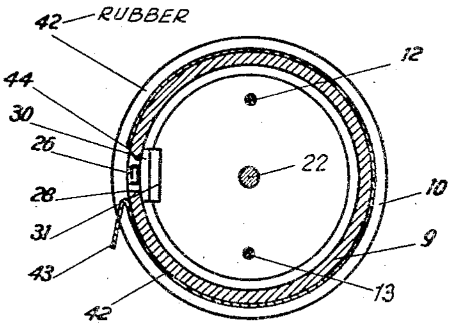

One of the special features of the invention already mentioned is that the exploration cylinder is provided with an elastic or flexible covering which includes a movable flap intended to bridge over the cavities or openings of the cylinder containing the attachment hooks. Figures 10 and 11 illustrate this feature.

The exploration cylinder 9 is provided on its exterior surface with an elastic or flexible covering 42 intended to furnish a surface easily deformable by a slight force of pressure, such as that applied to the recording or reproducing members with a view to ensuring a permanent contact between these members and the record sheet during the whole time of its exploration.

This elastic or flexible covering 42 may consist of a textile material, as for example a band of fabric, cloth or felt. It can likewise be formed of other sufficiently elastic material, having a base of rubber or plastic material, for example.

The fixing of this elastic or flexible covering 42 upon the exploration cylinder 9 can be done for example by adhesive, as represented in Figs. 10 and 11; it can likewise be done by mechanical means. For example, the end of the elastic covering upon the cylinder may extend into the interior of the cylinder through a slot provided for this purpose, adhesion being obtained by stretching the covering mechanically upon the cylinder by a suitable tentroning device located in the interior of the cylinder.

Whatever be the mode of fixing adopted, it is particularly important that, during its application upon the exploration cylinder, the elastic or flexible covering shall be highly stretched so that the exterior surface thus obtained, upon which the record sheet is to be wound, shall be a regular cylindrical surface of revolution.

The elastic or flexible covering may envelop the whole exterior surface of the exploration cylinder, suitable openings giving access to the attachment hooks for the record sheets. However, it is more advantageous to provide that the elastic or flexible covering 42 shall envelop only part of the exterior surface of the cylinder 9 and shall terminate in a movable flap 43 which, after the engagement of the eyelets 2 and 3 of the record sheet 1 upon the hooks 26 and 27, bridges over the portion of the exploration cylinder 9 having the openings for these hooks.

In this manner, the surface explored by the recording or reproducing members is made uniform without any break of continuity. The width of the movable flap 43 is such that the flap will cover exactly the portion of the exploration cylinder 9 which is not provided with the elastic or flexible covering 42.

The rectangular cavities or openings 28 and 29, provided in the exploration cylinder 9 for the hooks 26 and 27, can advantageously be chamfered at 44 and 45 so as to accommodate the edge 4 of the record sheet 1 when attached to and wound upon the cylinder.

Figure 12:
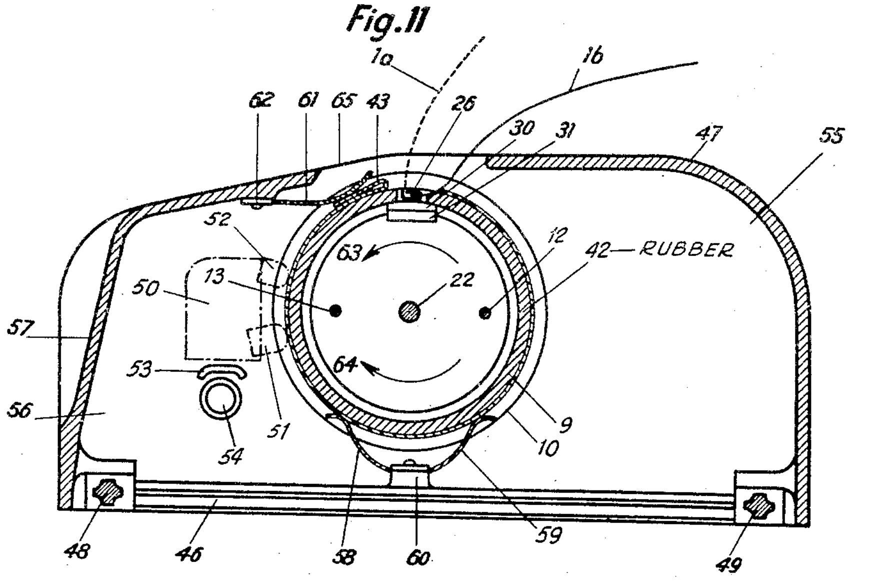
Fig. 12 is a cross-sectional view greatly simplified, of a dictating machine utilizing the record sheets and attaching means in accordance with the invention, this figure illustrating the operation of the elastic covering and flap.

Fig. 12 illustrated the action of the textile covering 42 during the operations of attaching and removing the record sheets upon a dictating machine utilizing the devices of the invention. In this figure, all detail which is not indispensable for the proper understanding of the invention has been omitted.

The dictating machine shown in Fig. 12 consists of a frame 46, supporting the assembly of the mechanism, and a case or lid 47 made of metal or moulded material. The case is fixed in a suitable manner, at 48 and 49, to the frame. Other fixing points not represented in the figure are likewise provided.

The figure also shows, without indicating their mode of suspension and fixing in relation to the frame:

(1) The exploration cylinder 9, supported by its shaft 22;

(2) The recording or reproducing members 50, comprising in particular a recording or reproducing pole-head 51 and an erasing pole-head 52;

(3) The runway 53 for the recording or reproducing members, in the form of a rail of suitable profile;

(4) The driving member for the movement of these recording or reproducing members, in the form of a worm or screw 54.

The shaft 22, supporting the exploration cylinder, and the screw 54 are rotated by a suitable transmission from a driving motor accommodated with the electrical amplifying apparatus in the compartment 55, the space 56 being reserved for the control means, of which the switches, buttons or other parts needing to be accessible externally are fixed to the wall 57 of the case 47.

Elastic pressure fingers 58 and 59 are secured at 60 to the frame 46, and other elastic fingers 61 are secured to the case 47 at 62. These elastic fingers are intended to bear upon the exterior surface of the cylinder 9 so as to maintain the record sheet constantly pressed upon it during exploration. The elastic fingers 58, 59 and 61, are distributed uniformly along longitudinal generatrices of the exploration cylinder 9.

The case 47 is provided with a rectangular opening 65 to permit the attachment of a record sheet upon the cylinder 9, or the removal of a sheet from the cylinder. The exploration of the sheet takes place along a helical magnetic line or track, the cylinder 9 being given a uniform movement of rotation upon its shaft 22 in the direction of the arrow 63, and the recording or reproducing members 50 being displaced uniformly, parallel to the shaft 22 along the support 53 by the action of the screw 54.

The attachment of a record sheet to the exploration cylinder is performed as follows:

When the cylinder 9 is at rest with the attachment hooks accessible through the opening 65 of the case 47, the movable flap 43 of the covering 42 is lifted up. The record sheet being placed in the position marked at 1*a*, its eyelets are engaged with the hooks and the sheet is then brought down into the position marked at 1*b*. The eyelets and hooks are then covered by the flap 43 of the elastic covering, and the record sheet is wound up by rotation of the cylinder 9 in the direction indicated by the arrow 63.

After a complete revolution of the cylinder 9 upon its attachment hooks not facing the opening 65 of the case, the cylinder 9 is made to turn in the direction indicated by the arrow 63 in order to bring it into the desired position and the procedure is as above.

It is likewise possible to turn the cylinder 9 in the direction indicated by the arrow 64, opposite to the direction of exploration. In these conditions, and depending upon the position in which the cylinder comes to rest, the movable flap 43 is folded back upon the cylinder 9 by the fingers 59, 58 or 61. When the hooks appear in the opening 65 of the case 47, the flap 43 is folded back and is maintained in this position, by the elastic fingers 61, as represented in Fig. 12.

It is then possible to proceed as indicated above and upon rotation of the cylinder 9 in the direction indicated by the arrow 63, the flap 43 will automatically cover the hooks and the eyelets of the record sheet which will have been placed upon the cylinder.

The removal of a record sheet from the exploration cylinder is effected as follows:

Whatever be the position in which the cylinder 9, covered with a record sheet, comes to rest, the cylinder is turned in the direction indicated by the arrow 63 until the free edge of the record sheet appears in the opening 65 of the case 47.

It is then possible to grasp the free edge of the record sheet and, by pulling upon the sheet, the exploration cylinder is caused to turn in the direction indicated by the arrow 64 until the hooks appear in the opening 65 of the case 47. In this rotation, the movable flap 43 of the covering 42 has been folded back upon the cylinder 9 by the fingers 59, 58 or 61 and is finally held folded back by the fingers 61, as indicated in Fig. 12.

It is then possible to remove the record sheet by bringing the latter into the position 1*a* and by disengaging the eyelets from the attachment hooks.

It will be easily understood that, by the utilization of the invention:

(*a*) The setting in place of a record sheet upon the exploration cylinder is done in a simple manner, in such a way that its setting in place effects a proper register between the recording or reproducing members and the magnetic lines or tracks of a sheet already recorded;

(*b*) The covering of the attachment means for the record sheet upon the exploration cylinder by a movable flap, made of the same material as the elastic covering of the cylinder, offers a continuous and homogeneous exploration surface, of which the characteristics are identical whatever may be the portion explored of the record sheet.

What I claim and desire to secure by Letters Patent is:

1. In magnetic sound recording apparatus, a record in the form of a thin flexible rectangular magnetizable sheet and a record holder comprising a rotating cylinder around which said record sheet is wrapped, said cylinder having recessed portions at one point in its circumference and having a continuous cylindrical surface except for said recessed portions, means in said recessed portions for holding one end of said record, said holding means being radially within the circumference of said cylinder, a covering of flexible resilient material surrounding said cylinder and having a circumferential length substantially equal to the circumference of said cylinder, one end portion of said covering being affixed to said cylinder adjacent said recessed portions and the opposite end portion of said covering being unattached to the cylinder and overlying said recessed portions of the cylinder.

2. In magnetic sound recording apparatus, a record in the form of a thin flexible rectangular magnetizable sheet having spaced apertured tabs projecting from one end edge only of said sheet, a record holder comprising a rotating cylinder around which said record sheet is adapted to be wrapped, said cylinder having spaced recesses therein disposed along a line parallel to the cylinder axis, said cylinder having a continuous cylindrical surface except for said recesses, the spacing of said recesses corresponding to the spacing of said tabs, means in said recesses adapted to engage said apertured tabs and thereby hold one end of said record sheet, said holding means being radially within the circumference of said cylinder, a covering of flexible resilient material wrapped around said cylinder and having a circumferential length substantially equal to the circumference of said cylinder, one end portion of said covering being affixed to said cylinder adjacent said recesses and the opposite end portion of said covering being unattached to the cylinder and overlying said recesses and the portions of said cylinder between the recesses in an axial direction, said unattached end portion constituting a flexible flap that is adapted to be flexed outwardly to afford access to said recesses and holding means.

3. Apparatus according to claim 2, in which said tabs are non-magnetic.

4. Apparatus according to claim 2, in which said holding means comprises hooks each comprising an inner circumferentially extending portion affixed to said cylinder, portions projecting radially from both ends of said inner circumferential portion, and an outer circumferential portion projecting forwardly from the rear radially projecting portion toward the forward radially projecting portion in the direction of rotation of said cylinder.

5. In magnetic sound recording apparatus of the kind in which a recording is made on a record comprising a rectangular magnetizable sheet having spaced apertured tabs projecting from one end edge of said sheet, a record holder comprising a rotating cylinder around which said record sheet is adapted to be wrapped, said cylinder having spaced recesses therein disposed along a line parallel to the cylinder axis, said cylinder having a continuous cylindrical surface except for said recesses, the spacing of said recesses corresponding to the spacing of said tabs, means in said recesses adapted to engage said apertured tabs and thereby hold one end of said record sheet, said holding means being radially within the circumference of said cylinder, a covering for said cylinder comprising a composite sheet of textile material and a resilient layer of rubber composition, said covering being wrapped around said cylinder and adhesively affixed thereto, the circumferential length of said covering being substantially equal to the circumference of said cylinder, one end of said covering being affixed to said cylinder near the trailing edges of said recesses and the opposite end portion of said covering overlying said recesses and portions of the cylinder surface between said recesses in an axial direction, said last mentioned end portion being unaffixed to the cylinder and constituting a flexible flap that is adapted to be flexed outwardly to afford access to said recesses and holding means.

6. Apparatus according to claim 5, in which there are provided resilient pressure fingers adapted to bear on the record sheet and hold it against the cylinder when the latter is rotated in a forward direction and engage said flexible flap to fold it back against an adjacent portion of said covering when the cylinder is turned in the opposite direction.

References Cited in the file of this patent

UNITED STATES PATENTS

| | | |
|---|---|---|
| 857,974 | Bancroft | June 25, 1907 |
| 912,724 | Pancoast | Feb. 16, 1909 |
| 1,159,941 | Hohner | Nov. 9, 1915 |
| 2,085,093 | Gauthier | June 29, 1937 |
| 2,172,431 | Bender | Sept. 12, 1939 |
| 2,216,608 | Anderson | Oct. 1, 1940 |
| 2,372,774 | Finch | Apr. 3, 1945 |
| 2,431,360 | Philpott | Nov. 25, 1947 |
| 2,512,940 | Janke | June 27, 1950 |
| 2,530,029 | Pond | Nov. 14, 1950 |

FOREIGN PATENTS

| | | |
|---|---|---|
| 783,581 | France | July 16, 1935 |
| 970,077 | France | Dec. 29, 1950 |